United States Patent
Szuba

(10) Patent No.: US 8,226,490 B2
(45) Date of Patent: Jul. 24, 2012

(54) COLLAPSIBLE SHAFT ASSEMBLY

(75) Inventor: Joseph Szuba, Dearborn, MI (US)

(73) Assignees: Szuba Consulting, Inc., Dearborn, MI (US); Value Extraction LLC, Dearborn, MI (US)

( * ) Notice: Subject to any disclaimer, the term of this patent is extended or adjusted under 35 U.S.C. 154(b) by 0 days.

(21) Appl. No.: 13/177,018

(22) Filed: Jul. 6, 2011

(65) Prior Publication Data
US 2012/0010007 A1 Jan. 12, 2012

Related U.S. Application Data

(60) Provisional application No. 61/361,542, filed on Jul. 6, 2010.

(51) Int. Cl.
*F16C 3/03* (2006.01)
(52) U.S. Cl. .................................. 464/162
(58) Field of Classification Search .......... 464/162, 464/182, 183; 403/359.6; 280/777
See application file for complete search history.

(56) References Cited

U.S. PATENT DOCUMENTS

| | | | |
|---|---|---|---|
| 5,481,937 A * | 1/1996 | Uphaus et al. | |
| 5,669,633 A * | 9/1997 | Naff et al. | 280/777 |
| 6,015,350 A | 1/2000 | Breese | |
| 6,267,528 B1 | 7/2001 | Higashino | |
| 6,942,386 B2 * | 9/2005 | Weissflog | |
| 7,007,362 B2 * | 3/2006 | Gibson | 464/162 |
| 7,056,218 B2 * | 6/2006 | Komori et al. | 464/182 |
| 7,160,195 B2 * | 1/2007 | Lyon | 464/162 |
| 7,168,741 B2 * | 1/2007 | Kinme et al. | 280/777 |
| 2006/0094516 A1 | 5/2006 | Lukac | |
| 2006/0217210 A1 | 9/2006 | Gibson | |
| 2007/0178975 A1 | 8/2007 | Neugebauer et al. | |
| 2010/0075766 A1 * | 3/2010 | Neugebauer et al. | 464/162 |

FOREIGN PATENT DOCUMENTS

WO 2005121582 A1 12/2005

OTHER PUBLICATIONS

"Aperture". Dictionary.com. [online], [retrieved on Nov. 17, 2011]. Retrieved from the Internet <URL: http://dictionary.reference.com/browse/aperture>.*
"Convex". Dictionary.com. [online], [retrieved on Nov. 17, 2011]. Retrieved from the Internet <URL: http://dictionary.reference.com/browse/convex>.*
"Tube". Dictionary.com. [online], [retrieved on Nov. 17, 2011]. Retrieved from the Internet <URL: http://dictionary.reference.com/browse/tube>.*
"Tubular". Dictionary.com. [online], [retrieved on Nov. 17, 2011]. Retrieved from the Internet <URL: http://dictionary.reference.com/browse/tubular>.*
PCT International Search Report dated Dec. 13, 2011 for International Application No. PCT/US2011/043049, 2 pages.

* cited by examiner

*Primary Examiner* — Gregory Binda
*Assistant Examiner* — Josh Skroupa
(74) *Attorney, Agent, or Firm* — Howard & Howard Attorneys PLLC

(57) ABSTRACT

A drive shaft assembly for a vehicle includes a first tubular member and a second tubular member. The second tubular member is mated to the first tubular member. The first tubular member defines a plurality of protuberances and the second tubular member includes a plurality of apertures. Each of the plurality of apertures receives one of the plurality of protuberances substantially affixing the first tubular member to the second tubular member in a circumferential orientation.

18 Claims, 4 Drawing Sheets

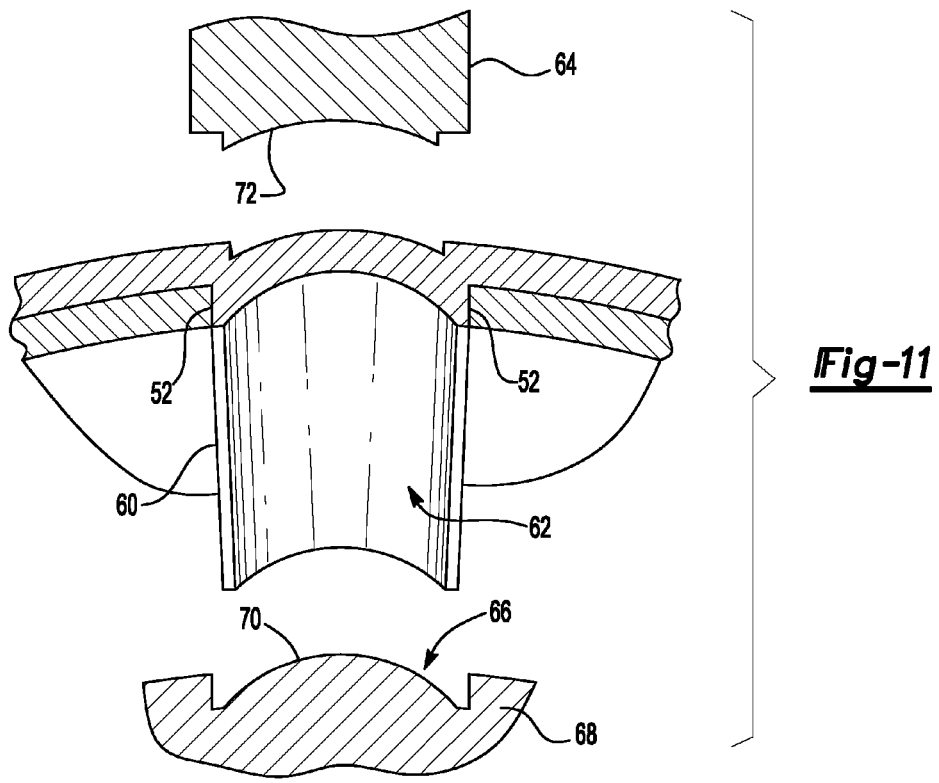
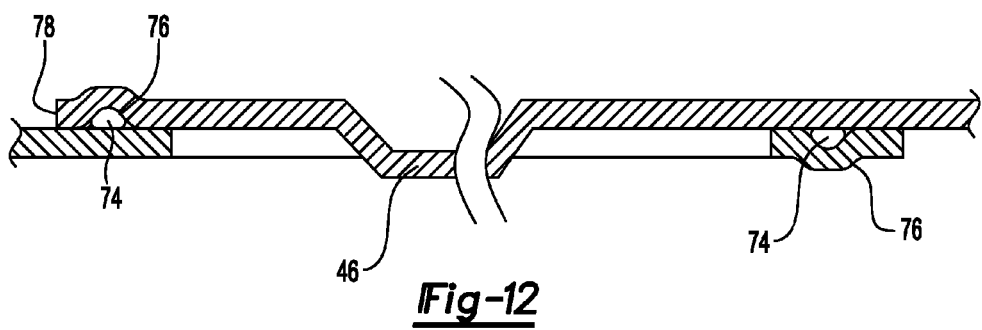

COLLAPSIBLE SHAFT ASSEMBLY

BACKGROUND OF THE INVENTION

The present invention relates generally toward a drive shaft of a motor vehicle. More specifically, the present invention relates to a collapsible driveshaft of a motor vehicle.

FIG. 1 shows a power train of a motor vehicle generally at 10. The power train includes a motor 12 that transfers torque to a driveshaft 14. The driveshaft 14 transfers the torque generated by the motor 12 to wheels 18 via differential 16 for driving the motor vehicle. To protect vehicle occupants in the event of a collision, the driveshaft 14 is designed to collapse upon itself if the vehicle length is compressed. When the driveshaft 14 does not collapses upon itself, it is known to encroach the vehicle cabin by bending, or otherwise being displaced in an upward direction.

A prior art driveshaft is generally shown at 20 of FIG. 2. The prior art driveshaft 20 is formed from a first tubular member 22 and a second tubular member 24. First splines 26 are formed on an inner surface of the first tubular member 22. Second splines 28 are formed on an outer surface of the second tubular member 24. When mating the first tubular member 22 to the second tubular member 24, the first splines 26 receive the second splines 28 along a coaxial direction as is best represented in FIG. 3. The first splines 26 receive torque from the second splines 28 to rotate the wheels 18 in a known manner. The first and second splines 26, 28 are covered with a boot 30 to prevent contamination from entering the driveshaft 14.

Problems exist with the prior art driveshaft 14 design that have not been overcome. For example, while FIG. 3 shows the first splines 26 perfectly mated with the second splines 28 for expediency, it is impossible to perfectly mate adjoining splines due to a variation in the manufacturing. It is known that small gaps exist between the first splines 26 and the second splines 28 that result in chatter and noise transmitted into the passenger compartment. Without this gap, the first and second tubular member 22,24 could not be assembled due to known variations in manufacturing processes. Furthermore, energy transfer is lost between the first tubular member 22 and the second tubular member 24 due to the spaces that are known to be unavoidable. Additionally, the manufacturing process for forming the splines 26, 28 into the tubular members 22, 24 is costly. The splines 26, 28 are either machined or cold formed into the tubular members 22, 24 causing a manufacturing bottleneck in the assembly process of the prior art driveshaft 14. Therefore, a need exists for a new type of collapsible driveshaft that does not require the slow and costly formation of splines and further eliminates spaces known to exist between existing splines.

SUMMARY OF THE INVENTION

The present invention relates to a driveshaft assembly for a motor vehicle. A first tubular member is mated to a second tubular member. The first tubular member defines a plurality of protuberances and the second tubular member includes a plurality of apertures. Each of the plurality of apertures receives one of the plurality of protuberances to affix the first tubular member to the second tubular member in a fixed circumferential orientation.

The assembly of the present invention eliminates the need to form splines into either of the tubular members substantially reducing the cost of manufacturing a driveshaft assembly. Further, the protuberances are formed into the first tubular member after the first and second tubular members are mated. This provides the ability to form a protuberance in a manner that causes the protuberance to securely abut the plurality of slots defined by the second tubular member. Therefore, a known defect of the prior art splines is resolved.

BRIEF DESCRIPTION OF THE DRAWINGS

Other advantages of the present invention will be readily appreciated as the same becomes better understood by reference to the following detailed description when considered in connection with the accompanying drawings wherein:

FIG. 11 shows an exploded view of an apparatus used to form the alternative protuberance; and FIG. 12 shows an alternative embodiment of the present invention with a ring seal.

DETAILED DESCRIPTION OF THE INVENTION

Figure 1:
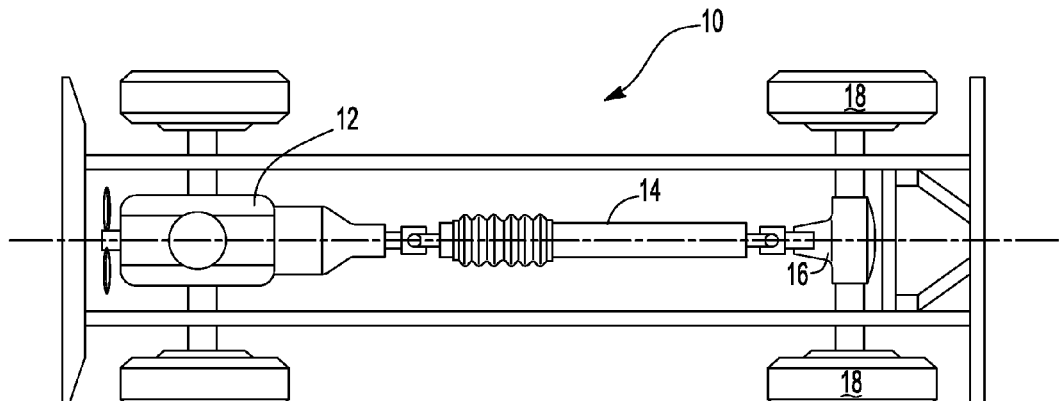
FIG. 1 shows a generic power train of a motor vehicle.
Figure 2:
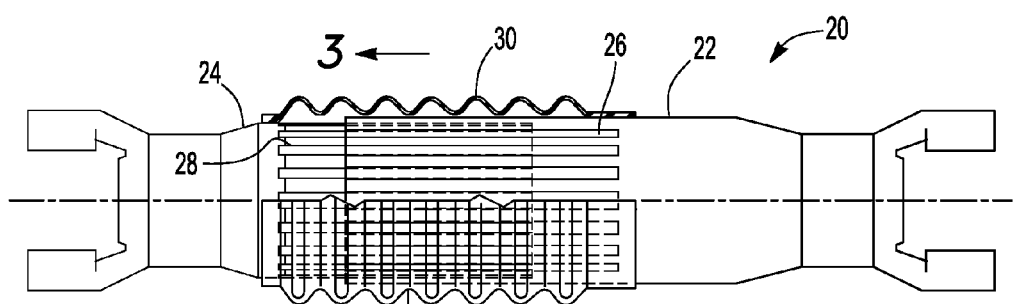
FIG. 2 shows a side view of a prior art driveshaft.
Figure 3:
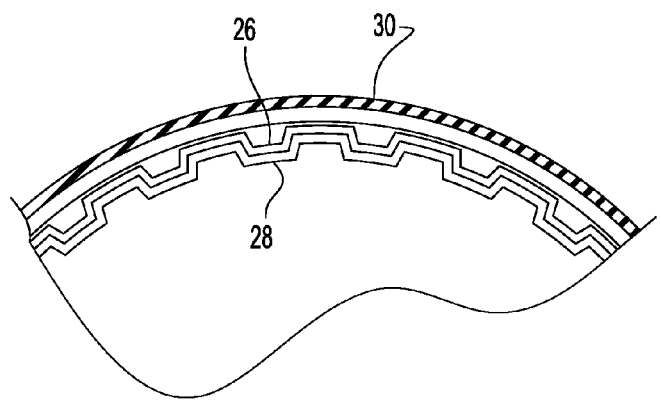
FIG. 3 shows a partial sectional view through line 3-3 of FIG. 2.
Figure 4:
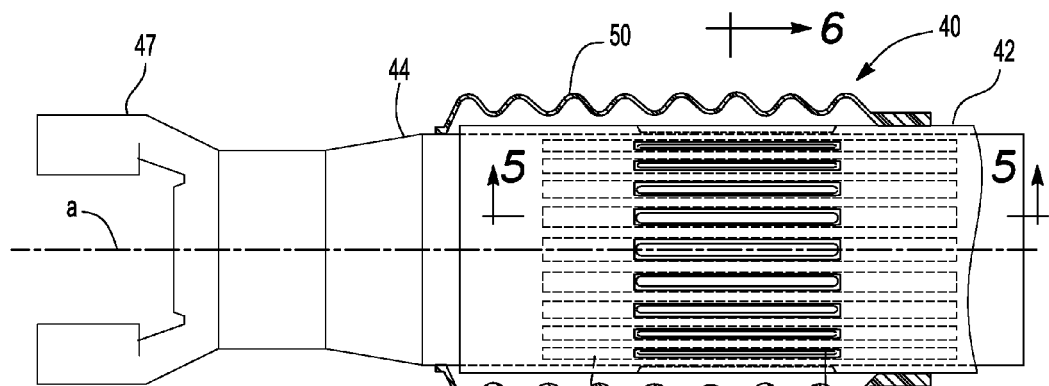
FIG. 4 shows a partial side view of a drive shaft assembly of the present invention.
Figure 5:
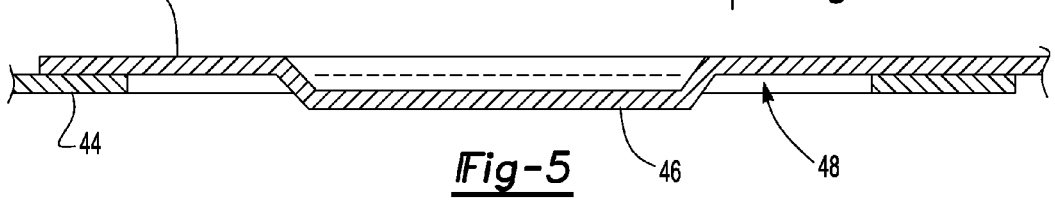
FIG. 5 shows a sectional view through line 5-5 of FIG. 4.

Referring to FIG. 4, the driveshaft assembly of the present invention is generally shown at 40. The assembly 40 includes a first tubular member 42 and a second tubular member 44. Each of the tubular members 42, 44 are connected to a yoke 47 of a universal joint as is known to those of skill in the art.

The first tubular member 42 includes a plurality of circumferentially spaced protuberances 46 extending radially inwardly toward axis A of the assembly 40. Each protuberance 46 is received by an aperture 48 defined by the second tubular member 44. Each aperture 48 takes the form of an elongated slot. A plurality of apertures 48 are circumferentially spaced around the second tubular member 44 as best represented in FIG. 4. Each protuberance 46 includes a length that is less than a length of the aperture 48 so that the first tubular member 42 and the second tubular member 44 articulate along axis a when necessary. Therefore, the second tubular member 44 slides inwardly into the first tubular number 42 if the vehicle compresses the driveshaft 40 during a collision. It is contemplated that the protuberance 46 is formed, but not lanced, so that the metal defining the first tubular member 42 is not pierced along the protuberance 46. However, it should be understood by those of ordinary skill in the art that each protuberance 46 could be lanced if necessary. It is further contemplated that each protuberance 46 is collapsible if the second tubular member 44 slides inwardly of the first tubular member 42 a distance greater than the length of the aperture 48.

Figure 6:
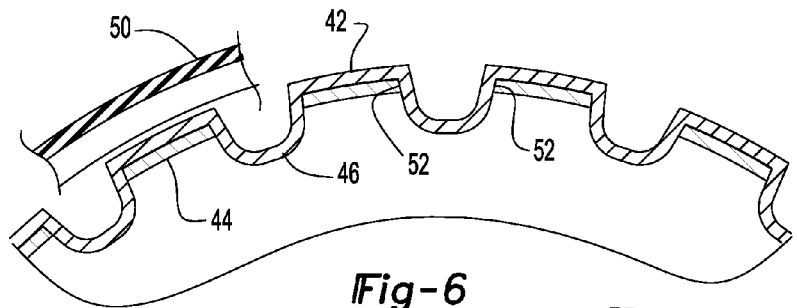
FIG. 6 shows a sectional view through line 6-6 of FIG. 4.

FIG. 6 shows a sectional view along line 6-6 of FIG. 4 so that one of ordinary skill in the art can see that each protuberance 46 extends radially inwardly beyond a wall thickness of the second tubular member 44 forming a circumferential locking engagement between the first tubular member 42 and the second tubular member 44. A boot 50 encloses the inner section between the first tubular member 42 and a second tubular member 44 to prevent dirt and contamination from entering the interior of the driveshaft assembly 40. It should further be noted that each protuberance 46 abuts both sidewalls 52 of each aperture 48 that receives a protuberance 46 to prevent circumferential slippage between the first tubular member 42 and the second tubular member 44.

Figure 7:
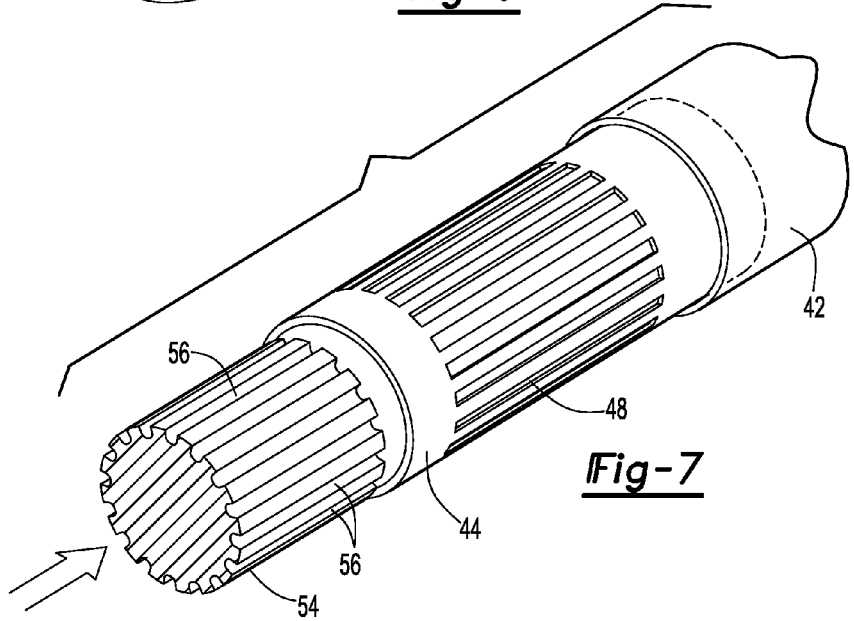
FIG. 7 shows a mandrel used to form a protuberance.
Figure 8:
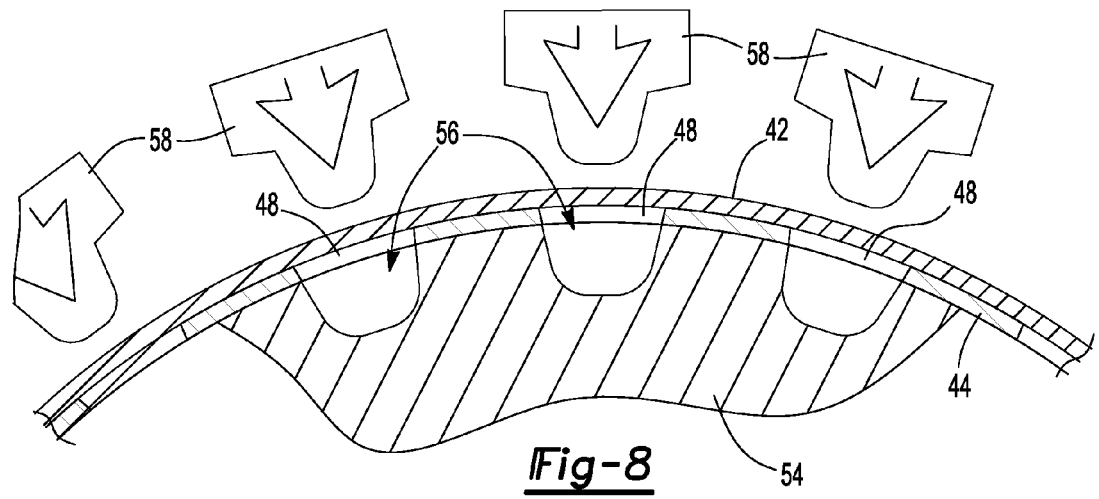
FIG. 8 shows a first stage of a method of forming the driveshaft assembly of the present invention.
Figure 9:
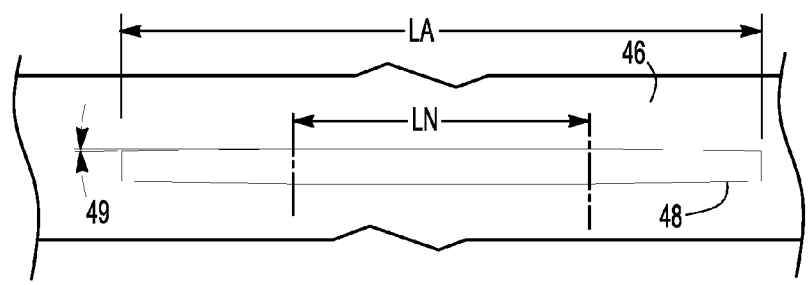
FIG. 9 shows a schematic of an aperture formed in a second tubular member.

As shown in FIG. 7, prior to attaching the yoke 47 to the assembly 40, the first and second tubular members 42 and 44 are mated so that the apertures 48 are covered by, the yet unformed, first tubular member 42. A mandrel 54 is inserted into the second tubular member 44 prior to forming the plurality of protuberances 46 in the first tubular member 42. The mandrel 54 includes a notch 56 that is aligned with one of the apertures 48 formed in the second tubular member 44. It should be understood by those of skill in the art that while the mandrel 54 shown in FIG. 9 represents a single notch 56 that a plurality of notches 56 may be defined by the mandrel 54 so that a plurality of notches 56 align with a plurality of apertures 48, as shown in FIG. 8. It should be further understood that the number of notches 56 can also match the number of apertures 48 defined by the second tubular member 44.

Referring now to FIG. 8, the die 58 is directed radially inwardly toward the axis 8 of the assembly 40. As represented, the notch 56 formed in the mandrel 54 is aligned with the aperture 48 defined by the second tubular member 44. The die 58 forces the first tubular member 42 radially inwardly into the notch 56 defined by the mandrel 54 to form the protuberance 46 used to retain the first tubular member 42 and second tubular member 44 in a circumferentially, substantially fixed relationship. It should be understood by those of ordinary skill in the art, that a plurality of dies 58 may simultaneously form protuberances 46 into a plurality of notches 56 defined in the mandrel 54 to increase manufacturing efficiency. The number of dies 58 is contemplated to match the number of apertures 48 defined by the second tubular member 44. However, it should be understood that a lesser number of dies 58 is also contemplated so that two or more forming steps may be utilized to complete the drive shaft assembly 40.

Figure 10:
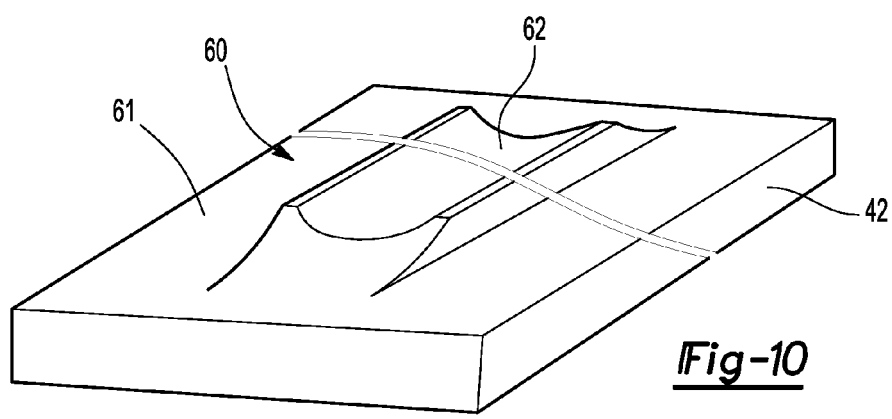
FIG. 10 shows an alternative protuberance formed in a first tubular member.

An alternative protuberance is generally shown at 60 of FIG. 10. The alternative protuberance 60 defines a substantially convex surface 62 spaced from an inner wall 61 of the first tubular member 42. As best represented in FIG. 11, the alternative protuberance 60 is formed by an alternative die 64 and an alternative notch 66 defined by an alternative mandrel 68. In this embodiment, the alternative notch 66 defines a convex surface 70 and the alternative die 64 defined in a correlating concave surface 72. Therefore, the alternative protuberance 60 receives a correlating restrike from the alternative mandrel 68 further forcing material from the first tubular member 42 against the aperture sidewalls 52 defining a tight circumferential fit between the protuberance 60 and the aperture 48. As shown in FIG. 9, aperture 48 alternatively includes a taper 49 to increase the amount of force required to compress the assembly 40.

FIG. 12 shows an alternative to the boot 50 of the present invention. In this embodiment, axially spaced ring seals 74 are located at opposing ends of the apertures 48 between the first tubular member 42 and the second tubular member 44. The ring seals 74 prevent contamination from entering the inner portion of the drive shaft assembly 40 through the aperture 48. To accommodate at least one of the ring seals 74, a groove 76 is formed into the first tubular member 42 proximate a distal end 78 of the first tubular member 42. Another groove 76 is formed into the second tubular member 44 to receive another one of the ring seals 74 proximate an opposing end of the aperture 48 from the distal end 78 of the first tubular member 42. As illustrated in FIG. 12, each protuberance 46 of the first tubular member 42 may extend radially outwardly into the corresponding aperture 48 defined by the second tubular member 44. In other words, in certain embodiments the first tubular member 42 is disposed within the second tubular member 44, while in other embodiments, the second tubular member 44 is disposed within the first tubular member 42.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation while material to the teachings of the invention without departing from the essential scope thereof. Therefore, it is intended that the invention not be limited to the particular embodiment disclosed as the best mode contemplated for carrying out this invention but that the invention will include all embodiments falling within the scope of the appended claims.

What is claimed is:

1. A drive shaft assembly for a vehicle, comprising:
a first tubular member and a second tubular member received by said first tubular member thereby defining a coaxial relationship between said tubular members, said first tubular member defining a plurality of protuberances and said second tubular member defining a plurality of apertures each having opposing sidewalls, with each of said plurality of apertures receiving one of said plurality of protuberances such that each of said protuberances abut said sidewalls of each respective said apertures and thereby affixing said first tubular member to said second tubular member in a substantially fixed circumferential orientation.

2. The assembly set forth in claim 1, wherein said plurality of apertures define a length along an axis of said first and second tubular members and said plurality of protuberances define a length along said axis of said first and second tubular members shorter than said length of said plurality of apertures thereby allowing said first tubular member to move axially relative to said second tubular member.

3. The assembly set forth in claim 1, wherein each of said plurality of protuberances define a protuberance width and each of said plurality of apertures define an aperture width, said widths being substantially the same thereby reducing circumferential movement between said first tubular member and said second tubular member.

4. The assembly set forth in claim 1, wherein each of said plurality of protuberances defines a radially inwardly surface having a substantially convex configuration.

5. The assembly set forth in claim 1, wherein each of said plurality of protuberances is collapsible during axial movement of said first tubular member relative to said second tubular member exceeding one half a difference in a length of said plurality of protuberances and a length of said plurality of said apertures.

6. The assembly set forth in claim 1, wherein said plurality of protuberances defined by said first tubular member extend radially inwardly into said plurality of apertures defined by said second tubular member.

7. The assembly set forth in claim 1, wherein said plurality of protuberances defined by said first tubular member extend radially outwardly into said plurality of apertures defined by said second tubular member.

8. The assembly set forth in claim 1, wherein each of said plurality of protuberances is circumferentially spaced in a common axial relationship.

9. The assembly set forth in claim 1, wherein said first tubular member and said second tubular member include a ring seal disposed there between.

10. A collapsible shaft assembly for a vehicle, comprising: a first tubular member and a second tubular member received by said first tubular member thereby defining a coaxial relationship between said tubular members, said first tubular member defining a plurality of protuberances defining a protuberance length and said second tubular member defining a plurality of apertures having an aperture length, each of said plurality of apertures each having opposing sidewalls and receiving one of said plurality of protuberances such that each of said protuberances abut said sidewalls of each respective said apertures and thereby affixing said first tubular member to said second tubular member in a fixed circumferential orientation and said protuberance length being less than said aperture length allowing axial movement of said first tubular member relative to said second tubular member.

11. The assembly set forth in claim 10, wherein each of said plurality of protuberances define a protuberance width and each of said plurality of apertures define an aperture width, said widths being substantially the same thereby preventing circumferential movement between said first tubular member and said second tubular member.

12. The assembly set forth in claim 10, wherein each of said plurality of protuberances defines a radially inwardly surface having a substantially convex configuration.

13. The assembly set forth in claim 10, wherein each of said plurality of protuberances is collapsible during axial movement of said first tubular member relative to said second tubular member exceeding one half a difference in a length of said plurality of protuberances and a length of said plurality of said apertures.

14. The assembly set forth in claim 10, wherein said plurality of protuberances defined by said first tubular member extend radially inwardly into said plurality of apertures defined by said second tubular member.

15. The assembly set forth in claim 10, wherein said plurality of protuberances defined by said first tubular member extend radially outwardly into said plurality of apertures defined by said second tubular member.

16. The assembly set forth in claim 10, wherein each of said plurality of protuberances is circumferentially spaced in a common axial relationship.

17. The assembly set forth in claim 10, wherein said first tubular member and said second tubular member include a ring seal disposed there between.

18. The assembly set forth in claim 10, wherein said plurality apertures each define a slot including a variable width narrowing at opposing ends of said slot.

* * * * *